United States Patent [19]
Tanno et al.

[11] Patent Number: 5,479,290
[45] Date of Patent: Dec. 26, 1995

[54] FARADAY'S ROTATOR AND OPTICAL ISOLATOR

[75] Inventors: Masayuki Tanno; Toshiaki Watanabe; Jun Horikoshi; Toshihiko Ryuo, all of Gunma, Japan

[73] Assignee: Shin-Etsu Chemical Co., Ltd., Tokyo, Japan

[21] Appl. No.: 240,915

[22] Filed: May 10, 1994

[30] Foreign Application Priority Data

May 14, 1993 [JP] Japan .................................. 5-113308

[51] Int. Cl.$^6$ ........................................... G02F 1/00
[52] U.S. Cl. ........................ 359/324; 359/282; 359/280; 359/321; 359/484
[58] Field of Search ...................... 359/324, 280, 359/282, 321, 484

[56] References Cited

U.S. PATENT DOCUMENTS

| | | | |
|---|---|---|---|
| 3,516,726 | 6/1970 | Dillon | 359/324 |
| 4,604,577 | 8/1986 | Matsumura | 324/344 |
| 4,932,760 | 6/1990 | Arii | 359/324 |
| 4,981,341 | 1/1991 | Brandle | 359/484 |
| 5,198,923 | 5/1993 | Watanabe | 359/324 |
| 5,381,261 | 1/1995 | Hirai | 359/282 |

Primary Examiner—Georgia Y. Epps
Assistant Examiner—Ricky Mack
Attorney, Agent, or Firm—McAulay Fisher Nissen Goldberg & Kiel

[57] ABSTRACT

A Faraday's rotator comprises a magnetic crystal which has a composition represented by the following compositional formula: $(Tb_{1-(a+b+c+d)}Ln^1{}_a Ln^2{}_b Bi_c M^1{}_d)_3(Fe_{1-e}M^2{}_e)_5 O_{12}$, has a lattice constant of $12.383 \pm 0.006$ Å and is grown through the liquid phase epitaxial growth technique. In the foregoing formula, $Ln^1$ is at least one element selected from the group consisting of Yb, Lu and Tm; $Ln^2$ is at least one member selected from the group consisting of rare earth elements except for Yb, Lu, Tm and Tb; $M^1$ is at least one element selected from the group consisting of Ca, Mg and Sr; $M^2$ is at least one element selected from the group consisting of Al, Ga, Ti, Si and Ge; $0.2 \leq a \leq 0.6$, $0 \leq b \leq 0.3$, $0 < c \leq 0.16$, $0 < d \leq 0.02$ and $0 < e \leq 0.1$. Another Faraday's rotator comprises a magnetic crystal having a composition represented by the following compositional formula: $(Tb_{1-(a+b+c+d+f)}Ln^1{}_a Ln^2{}_b Bi_c M^2{}_e)_5 O_{12}$, wherein $Ln^1$, $M^1$, $M^2$, a, b, c and e are the same as those defined above; $Ln^2$ is a member selected from the group consisting of rare earth elements except for Yb, Lu, Tm, Tb and Eu; $0 \leq d \leq 0.02$ and $0 < f \leq 0.2$. An optical isolator is provided with such a Faraday's rotator in the interior thereof.

8 Claims, 3 Drawing Sheets

FARADAY'S ROTATOR AND OPTICAL ISOLATOR

BACKGROUND OF THE INVENTION

The present invention relates to a Faraday's rotator and an optical isolator for wavelength division-multiplex transmission systems, which makes use of the Faraday's rotator.

Optical communication systems and optical measuring instruments to which the wavelength division-multiplex transmission technique is applied has attracted special interest recently. The wavelength division-multiplex transmission technique permits fast and large capacity information interchange. It is generally observed that, in the optical communication system, light rays emitted from a light source are reflected by the end faces of various optical systems incorporated into the communication system and the reflected light rays are returned towards the light source. Accordingly, the optical communication system, in general, requires the use of an optical device for preventing the reflected light rays from returning back towards the light source. The optical isolator is used as such an optical device. The optical isolator used in the wavelength division-multiplex transmission system must have high light-extinction properties such that a plurality of transmitted light rays which fall within different wavelength ranges and are reflected and returned back towards a light source can effectively be cut off.

There have been proposed some attempts for improving optical isolators for wavelength division-multiplex transmission systems. For instance, T. Tamaki et al. proposes an optical isolator which can ensure a low insertion loss and always ensures a strong ability of extinguishing light rays transmitted through optical systems and reflected back towards the source thereof through reflection irrespective of the wavelengths of the light rays (see J. Appl. Phys., 1991 (Oct.), 70(8), p. 15). In addition, Japanese Patent Provisional Publication No. 4-242221 discloses an optical isolator which makes use of a Faraday's rotator whose Faraday's rotational angle is not affected by the wavelengths of transmitted light rays.

In the foregoing articles, the growth of crystal for the Faraday's rotators applied to optical isolators are performed according to the fluxing technique. However, the fluxing technique suffers from a problem of low processability because of its low reproducibility and low productivity. For this reason, this method does not, in fact, permit the production of optical isolators for wavelength division-multiplex transmission systems in high productivity and in a low production cost. In the optical isolator disclosed in Japanese Patent Provisional Publication No. 4-242221, the lattice constant of the crystal used in the Faraday's rotator is in a wide range extending from 12.426 to 12.484 Å. Therefore, the crystal is prepared by depositing a crystalline layer on a samarium-gallium-garnet substrate (SGG substrate) having a composition represented by the compositional formula: $Sm_3Ga_5O_{12}$ and having a lattice constant of 12.439 Å, through the liquid phase epitaxial crystal growth technique. The SGG substrate per se is quite expensive, the lattice constant of the substrate surface greatly varies depending on the production lots and accordingly, the crystal deposited thereon is easily cracked. This correspondingly results in an increase in the production cost.

SUMMARY OF THE INVENTION

The present invention has been developed under such circumstances and accordingly, an object of the present invention is to provide a Faraday's rotator which can be produced at a low cost and high productivity as well as an optical isolator for wavelength division-multiplex transmission systems, which makes use of the cheap Faraday's rotator capable of being produced in high yield as an optical devices, is cheap and can be prepared in high productivity, shows a low insertion loss when the Faraday's rotator is introduced into the isolator and exhibits a high ability of extinguishing any light rays reflected by the optical component and returned to a light source, irrespective of the wavelengths of the reflected light rays.

According to an aspect of the present invention, there is provided a Faraday's rotator which is composed of a magnetic crystal which has a composition represented by the following compositional formula: $(Tb_{1-(a+b+c+d)}Ln^1{}_aLn^2{}_bBi_cM^1{}_d)_3(Fe_{1-e}M^2{}_e)_5O_{12}$, has a lattice constant of 12.383±0.006 Å and is grown through the liquid phase epitaxial growth technique. In the foregoing compositional formula, $Ln^1$ is at least one element selected from the group consisting of Yb, Lu and Tm; $Ln^2$ is at least one member selected from the group consisting of rare earth elements except for Yb, Lu, Tm and Tb; $M^1$ is at least one element selected from the group consisting of Ca, Mg and Sr; $M_2$ is at least one element selected from the group consisting of Al, Ga, Ti, Si and Ge; $0.2 \leq a \leq 0.6$, $0 \leq b \leq 0.3$, $0 < c \leq 0.16$, $0 < d \leq 0.02$ and $0 < e \leq 0.1$.

According to another embodiment of the Faraday's rotator of the present invention, the Faraday's rotator is composed of a magnetic crystal having a composition represented by the following compositional formula: $(Tb_{1-(a+b+c+d+f)}Ln^1{}_aLn^2{}_bBi_cM^1{}_dEu_f)_3(Fe_{1-e}M^2{}_e)_5O_{12}$, wherein $Ln^2$ is a member selected from the group consisting of rare earth elements except for Yb, Lu, Tm, Tb and Eu; $0 \leq d \leq 0.02$, $0 < f \leq 0.2$; and $Ln^1$, $M^1$, $M^2$, a, b, c and e are the same as those defined above in connection with the first embodiment.

According to another aspect of the present invention, there is provided an optical isolator which is provided therein with these Faraday's rotators 1 (1a, 1b).

The Faraday's rotator and optical isolator according to the present invention are cheap and can be prepared in good productivity since the crystal as the material therefor does not cause any cracking during the production thereof. Ca ions, Mg ions and Sr ions are dispersed in the crystal and this, accordingly, leads to a substantial decrease in the insertion loss of the resulting device observed when the optical components are incorporated thereinto. Moreover, the variation of the Faraday's rotational angle is low because of the introduction of Bi and/or Tb ions into a region 24c and the rotator has a high ability of extinguishing light rays once transmitted through the rotator and then reflected back towards the light source, irrespect of the wavelengths of the reflected light rays.

DETAILED DESCRIPTION OF THE INVENTION

Figure 1:
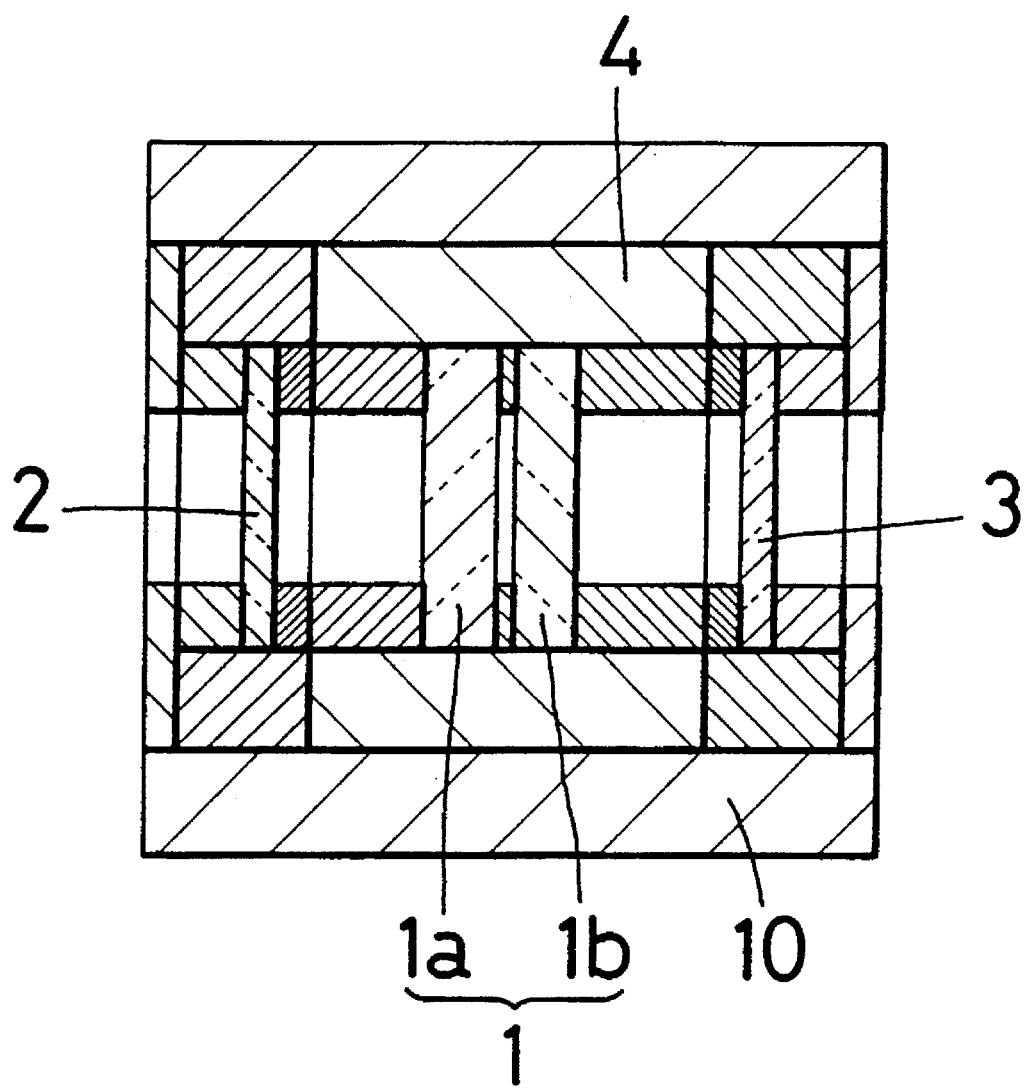
FIG. 1 is a cross sectional view of an embodiment of the optical isolator according to the present invention.

The Faraday's rotator according to the present invention is composed of a magnetic crystal which has a composition represented by the following compositional formula: $(Tb_{1-(a+b+c+d)}Ln^1_aLn^2_bBi_cM^1_d)_3(Fe_{1-e}M^2_e)_5O_{12}$, which has a lattice constant of $12.383\pm0.006$ Å and which is grown through the liquid phase epitaxial growth technique.

In the foregoing compositional formula, $Ln^1$ is at least one element selected from the group consisting of Yb, Lu and Tm; $Ln^2$ is at least one member selected from the group consisting of rare earth elements except for Yb, Lu, Tm and Tb such as La, Pr, Nd, Gd, Dy and Ho; $M^1$ is at least one element selected from the group consisting of Ca, Mg and Sr; and $M^2$ is at least one element selected from the group consisting of Al, Ga, Ti, Si and Ge.

The value "a" represents the rate of the elements Yb, Lu and/or Tm represented by $Ln^1$ and the rate is relatively high and falls within the range: $0.2 \leq a \leq 0.6$. These elements each has a small ionic radius. This ensures the desired lattice constant of the resulting crystal if the value "a" falls within the range defined above and correspondingly any cracking of the crystal does not caused during the crystal growth. The value "b" represents the rate of the element(s) represented by $Ln^2$ and falls within the range: $0 \leq b \leq 0.3$. The lattice constant is beyond the desired range defined above if the value "b" exceeds 0.3 and therefore, the upper limit thereof is determined to be 0.3. The value "c" stands for the rate of Bi which is relatively small and falls within the range: $0 < c \leq 0.16$. If the value "c" exceeds 0.16, the Faraday's rotational angle is greatly affected by the difference in the wavelengths of the transmitted light rays. The value "d" stands for the rate of the elements Ca, Mg and/or Sr represented by $M^1$. These elements serve to prevent absorption of light by the rotator and to thus improve the light-transmittance thereof. It is sufficient to incorporate these elements into the crystal, in the form of ions, in only a trace amount and the amount thereof thus falls within the range: $0 < d \leq 0.02$. The value "e" means the rate of the elements al, Ga, Ti, Si and/or Ge represented by $M_2$ which are substituted for the iron component and falls within the range: $0 < e \leq 0.1$. The elements Al and/or Ga are involved in the lattice constant and the saturation magnetization of the Faraday's rotator. On the other hand, the elements Ti, Si and/or Ge show the same effects as those achieved by Ca, Mg and Sr when the coexisting Fe ions are in the bivalent state. Moreover, if the value "e" exceeds 0.1, the lattice constant of the rotator is beyond the desired range defined above and the saturation magnetization of the rotator correspondingly exceeds 1000 gauss.

Specific examples of preferred such Faraday's rotators according to the present invention are those produced from crystals having compositions represented by the following compositional formulas:

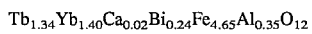

$Tb_{1.34}Yb_{1.40}Ca_{0.02}Bi_{0.24}Fe_{4.65}Al_{0.35}O_{12}$

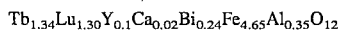

$Tb_{1.34}Lu_{1.30}Y_{0.1}Ca_{0.02}Bi_{0.24}Fe_{4.65}Al_{0.35}O_{12}$

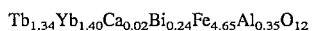

$Tb_{1.34}Yb_{1.40}Ca_{0.02}Bi_{0.24}Fe_{4.65}Al_{0.35}O_{12}$

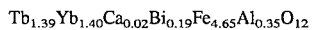

$Tb_{1.39}Yb_{1.40}Ca_{0.02}Bi_{0.19}Fe_{4.65}Al_{0.35}O_{12}$

The Faraday's rotator of this type can be produced according to the so-called liquid phase epitaxial growth technique which comprises the steps of, for instance, mixing components having garnet ingredients such as $Tb_4O_7$, $Yb_2O_3$, $Bi_2O_3$, $Fe_2O_3$, $Al_2O_3$ and/or $CaCO_3$ with flux components such as $B_2O_3$ and/or PbO, introducing the resulting mixture into a crucible of platinum, then melting it by heating it at a temperature of about 1100° C., then maintaining the melt temperature at a constant level of about 830° C., dipping a substrate of a nonmagnetic garnet in the foregoing melt and rotating the substrate in the melt to grow the crystal of the melt on the substrate. A gadolinium-gallium garnet substrate (GGG substrate) having a composition represented by the following compositional formula: $Gd_3Ga_5O_{12}$ is used as the substrate of nonmagnetic garnet since it has a lattice constant of $12.383\pm0.003$ Å and the lattice constant thereof hardly cause any fluctuation depending on the production lots and positions on the surface.

Another embodiment of the Faraday's rotator of the present invention is formed from a magnetic crystal which has formula: $(Tb_{1-(a+b+c+d+f)}Ln^1_aLn^2_bBi_cM^1_dEu_f)_3(Fe_{1-e}M^2_e)_5O_{12}$, has a lattice a composition represented by the following compositional constant of $12.383\pm0.006$ Å and is produced according to the liquid phase epitaxial growth technique.

In the Formula, $Ln^1$, $M^1$ and $M^2$ are the same as those defined above in connection with the first embodiment of the Faraday's rotator. In other words, $Ln^1$ is at least one rare earth element selected from the group consisting of Yb, Lu and Tm; $M^1$ is at least one element selected from the group consisting of Ca, Mg and Sr; and $M^2$ is at least one element selected from the group consisting of Al, Ga, Ti, Si and Ge.

$Ln^2$ is at least one member selected from the group consisting of rare earth elements except for Yb, Lu, Tm, Tb and Eu, such as La, Pr, Nd, Gd, Dy and Ho.

The values "a", "b", "c" and "e" are the same as those defined above in connection with the first embodiment of the Faraday's rotator of the present invention. More specifically, the value "a" represents the rate of the elements Yb, Lu and/or Tm represented by $Ln^1$ and the rate is relatively high and falls within the range: $0.2 \leq a \leq 0.6$. These elements each has a small ionic radius. This ensures the desired lattice constant of the resulting crystal if the value "a" falls within the range defined above. The value "b" represents the rate of the element(s) represented by $Ln^2$ and falls within the range: $0 \leq b \leq 0.3$. The lattice constant is beyond the desired range defined above if the value "b" exceeds 0.3. The value "c" stands for the rate of Bi which is relatively small and falls within the range: $0 < c \leq 0.16$. If the value "c" exceeds 0.16, the Faraday's rotational angle is greatly affected by the difference in the wavelengths of the transmitted light rays. The value "e" means the rate of the elements Al, Ga, Ti, Si and/or Ge represented by $M_2$ which is substituted for the iron component and falls within the range: $0 < e \leq 0.1$. The elements Al and/or Ga are involved in the lattice constant and the saturation magnetization of the Faraday's rotator. On the other hand, the elements Ti, Si and/or Ge show the same effects as those achieved by Ca, Mg and Sr when the coexisting Fe ions are in the bivalent state. Moreover, if the value "e" exceeds 0.1, the lattice constant of the rotator is beyond the desired range defined above and the saturation magnetization of the rotator correspondingly exceeds 1000 gauss.

The value "f" represents the rate of the element Eu capable of improving the light-transmittance of the resulting rotator. If the element Eu is present in the film, the overall absorbance of the Faraday's rotator is reduced and thus the light-transmittance thereof is increased. It is sufficient to add this element to the crystal in only a small amount falling within the range: $0 < f \leq 0.2$. The value "d" stands for the rate of the elements Ca, Mg and/or Sr represented by $M^1$. These elements serve to prevent absorption of light by the rotator and to thus improve the light-transmittance thereof. It is sufficient to incorporate these elements into the crystal in only a trace amount if Eu is present in the crystal and the amount thereof falls within the range: $0 \leq d \leq 0.02$.

Specific examples of preferred such Faraday's rotators are those produced from crystal having compositions represented by the following compositional formulas:

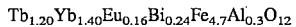

$Tb_{1.20}Yb_{1.40}Eu_{0.16}Bi_{0.24}Fe_{4.7}Al_{0.3}O_{12}$

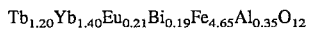

$Tb_{1.20}Yb_{1.40}Eu_{0.21}Bi_{0.19}Fe_{4.65}Al_{0.35}O_{12}$

The Faraday's rotator according to the second embodiment can be prepared by the procedures almost identical to those used for the production of the first Faraday's rotator. More specifically, it can be produced according to the so-called liquid phase epitaxial growth technique which comprises the steps of, for instance, mixing starting materials having garnet ingredients such as $Tb_4O_7$, $Eu_2O_3$, $Yb_2O_3$, $Bi_2O_3$, $Fe_2O_3$ and/or $Al_2O_3$ with flux components such as $B_2O_3$ and/or PbO, introducing the resulting mixture in a crucible of platinum, then melting it by heating up to a temperature on the order of 1100° C., then maintaining the melt temperature at a constant level of about 830° C., dipping a GGG substrate in the foregoing melt and rotating the substrate in the melt to grow the crystal of the melt on the substrate.

These first and second Faraday's rotator each may be subjected to mirror finishing to reduce the thickness thereof to not more than about 1.6 mm, then an anti-reflection film is applied onto the surface thereof and a plurality of the rotators may be put in layers to thus adjust the Faraday's rotational angle to a level of around 45°. Thus, the Faraday's rotators according to the present invention can be produced in a high yield.

As seen from FIG. 1, the optical isolator of the present invention is provided therein with Faraday's rotators 1 (1a and 1b). The rotator 1 (1a or 1b) may be the foregoing first or second Faraday's rotator.

The optical isolator comprises a cylindrical body 10 provided therein with Faraday's rotators 1, a polarizer 2, an analyzer 3, the rotators being sandwiched between the polarizer 2 and the analyzer 3, and a magnetic body 4. Glass polarizers and polarizers comprising laminated films composed of dielectric material and metal are, for instance, used as the polarizer 2 and the analyzer 3 for the reduction of the size of the resulting optical isolator. A crystal showing birefringency may be used for the production of an optical isolator having lower polarization-dependency. In the production of the optical isolator, other optical components such as a wave plate may optionally be inserted or incorporated into the isolator in addition to the foregoing parts.

The Faraday's rotator 1 incorporated into the optical isolator may likewise be produced by subjecting the light-transmitting face thereof to mirror polishing, then applying an anti-reflection coating thereto and putting a plurality of such Faraday's rotators in layers so that the optical planes 1a and 1b face each other as shown in FIG. 1. In this respect, if the Faraday's rotational angle is equal to or around 45°, a single Faraday's rotator can be used, or at least three Faraday's rotators are sometimes required for adjusting the rotational angle to around 45°. Moreover, the optical isolator may be in the monostage shape as discussed above or multistage shapes. In addition, it may also be applied to an in-line type optical isolator which is used in an optical fiber type amplifier and whose ends are both connected to optical fibers.

The variation of the Faraday's rotational angle depending on the variation of the wavelengths of transmitted light rays is affected by the chemical species of ions occupying the region 24c on the rotator having such a structure. In the Faraday's rotator according to the present invention, Bi ions and/or Tb ions are introduced into the region 24c and ions having small ionic radii such as Yb, Lu and/or Tm ions may likewise be introduced into the region. This permits the inhibition of any variation of the Faraday's rotational angle due to the variation of the wavelengths of transmitted light rays falling within the near infrared region. Moreover, the lattice constant of the rotator is controlled by the addition of ions of other rare earth elements, and Fe, Al and/or Ga ions to the crystal structure thereof. The addition of Ca, Mg, Sr, Ti, Si, Ge or Eu thereto permits the improvement in the light-transmittance of the resulting rotator.

Good matching of the lattice parameter is established between the GGG substrate and the magnetic crystal having a lattice constant of 12.383±0.006 Å and represented by the foregoing compositional formula during growing the crystal and accordingly, the crystal hardly causes any cracking. Therefore, a large number of Faraday's rotators can efficiently be produced from the crystal wafer having the composition represented by the foregoing formula in good productivity.

The present invention will hereunder be explained in more detail with reference to the following Examples, but the present invention is by no means limited to these specific Examples.

EXAMPLE 1

To a crucible of platinum, there were added $Tb_4O_7$, $Yb_2O_3$, $Bi_2O_3$, $Fe_2O_3$, $Al_2O_3$, $CaCO_3$, $B_2O_3$ and PbO as starting materials, they were melted by heating at about 1100° C., the resulting melt was maintained at a temperature of about 830° C., then a GGG substrate was dipped in the melt and rotated therein to grow an epitaxial film thereon. In this respect, the substrate used for growing the crystal was a GGG substrate having a diameter of 25 mm and a thickness of 1.5 mm. Thus, a magnetic crystal having a composition represented by the compositional formula: $Tb_{1.34}Yb_{1.40}Ca_{0.02}Bi_{0.24}Fe_{4.65}Al_{0.35}O_{12}$ was formed on both sides of the GGG substrate in a thickness of about 1.6 mm, according to the liquid phase epitaxial growth technique, and there was not observed any cracking. The lattice constant thereof was determined by the Bond's method and found to be 12.381 Å.

The GGG substrate on which the crystal was formed was cut into two disk-like pieces along the direction perpendicular to the direction of its thickness and at the center thereof, the remaining GGG substrate adhered to the magnetic crystal was removed by grinding to thus give the epitaxial crystalline body having the composition represented by the compositional formula: $Tb_{1.34}Yb_{1.40}Ca_{0.02}Bi_{0.24}Fe_{4.65}Al_{0.35}O_{12}$. The resulting magnetic crystal (both surface and back face) was further subjected to mirror polishing to give two optical faces. The resulting magnetic crystal chip had a size of 2 mm square and a thickness of 1.4 mm. An anti-reflection coating which comprised two layers of $SiO_2$ and $Al_2O_3$ respectively was applied onto the mirror-polished two faces of the chip having a size of 2 mm square.

Two out of the chips subjected to the coating treatment were put in piles so that the optical faces thereof faced each other to give a Faraday's rotator. The Faraday's rotator was placed in a magnetic field of 1000 Oe and a linearly polarized light having a wavelength of 1550 nm was transmitted through the rotator. The plane of polarization of the transmitted light was rotated at an angle of 44.5° expressed in terms of the rotational angle of polarized plane (i.e., Faraday's rotational angle). It was also found that the wavelength range within which the Faraday's rotational angle was maintained at 45°±1.0° (wavelength-dependency) extended from 1510 to 1640 nm.

Figure 2:
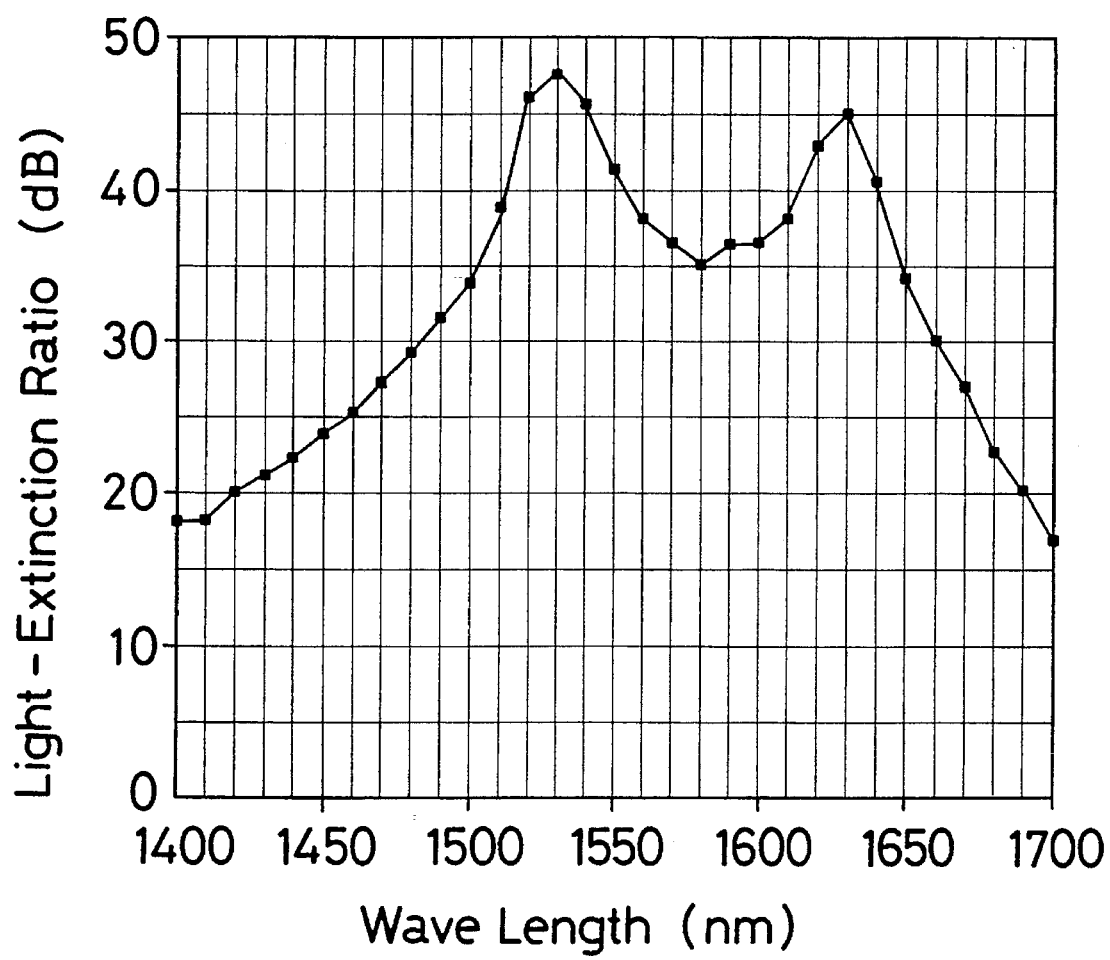
FIG. 2 is a graph showing the relation between the light-extinction ratios and the wavelengths observed on the optical isolators according to the present invention prepared in Examples 1 to 3 and 5.

A polarizer 2, a Faraday's rotator 1 and an analyzer 3 were arranged in this order to give an optical isolator by way of experiment as shown in FIG. 1. Glass polarizers were used as the polarizer and the analyzer, a magnetic field of the same magnitude used above was applied to the Faraday's rotator and a plurality of light rays having different wavelengths were transmitted through the rotator. The light-extinction ability, i.e., the ability of cutting off each transmitted light which was transmitted through the optical isolator, reflected by the end faces of various optical systems and again returned back to the optical isolator was determined in terms of an extinction ratio. The relation between the wavelengths of the transmitted light rays and the light-extinction ratios is shown in FIG. 2.

The extinction ratio and the insertion loss of the isolator was determined using light rays having a wavelength of 1550 nm and found to be 42 dB and 0.5 dB respectively. In general, the extinction ratio for light rays reflected back must be not less than 35 dB. As seen from FIG. 2, the isolator showed an extinction ratio of not less than 35 dB over a wide wavelength range extending from 1510 to 1640 nm. Moreover, the change in the insertion loss of the isolator was found to be very small on the order of 0.5 dB±0.3 dB within this wavelength range.

EXAMPLE 2

A magnetic crystal, i.e., an epitaxial film, was prepared according to the same liquid phase epitaxial growth technique used in Example 1 except that $Y_2O_3$ was added to the starting materials for the melt of Example 1. The thickness of the resulting film was controlled to the same level used in Example 1, but any cracking was not caused. The resulting magnetic crystal was found to have a composition represented by the compositional formula: $Tb_{1.34}Yb_{1.30}Y_{0.1}Ca_{0.02}Bi_{0.24}Fe_{4.65}Al_{0.35}O_{12}$ and a lattice constant of 12.382 Å.

The magnetic crystal chip thus prepared was subjected to polishing and then a coating treatment in the same manner used in Example 1 and a plurality of the chips thus treated were put in piles to give a Faraday's rotator. The resulting rotator was placed in a magnetic field having the same magnitude used in Example 1 and examined for the rotational angle of the plane of polarization using a linearly polarized light having a wavelength of 1550 nm and the wavelength-dependency which were found to be identical to those observed in Example 1. Then an optical isolator was formed by combining the rotator with a polarizer 2, an analyzer 3 and the like in the same manner used in Example 1. All of the light-extinction ratio, the insertion loss and the extinction ratio for the light reflected back were likewise determined using a light having a wavelength of 1550 nm and found to be identical to those observed in Example 1. The relation between the wavelengths of transmitted light rays and the extinction ratios was also identical to that observed in Example 1 as shown in FIG. 2. The same was true for the insertion loss measurement.

EXAMPLE 3

A magnetic crystal, i.e., an epitaxial film, was prepared according to the same liquid phase epitaxial growth technique used in Example 1 except that $Lu_2O_3$ was substituted for the $Yb_2O_3$ used in Example 1. The thickness of the resulting film was controlled to the same level used in Example 1, but any cracking was not caused. The resulting magnetic crystal was found to have a lattice constant identical to that observed for the body prepared in Example 1 and a composition represented by the compositional formula:

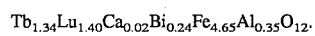

$Tb_{1.34}Lu_{1.40}Ca_{0.02}Bi_{0.24}Fe_{4.65}Al_{0.35}O_{12}$.

The magnetic crystal chip thus prepared was subjected to polishing and then a coating treatment in the same manner used in Example 1 and a plurality of the chips thus treated were put in piles to give a Faraday's rotator. The resulting rotator was placed in a magnetic field having the same magnitude used in Example 1 and examined for the rotational angle of the plane of polarization using a linearly polarized light having a wavelength of 1550 nm and the wavelength-dependency which were found to be identical to those observed in Example 1. Then an optical isolator was formed by combining the rotator with a polarizer 2, an analyzer 3 and the like in the same manner used in Example 1. All of the light-extinction ratio, the insertion loss and the extinction ratio for the light reflected back were likewise determined using a light having a wavelength of 1550 nm and found to be identical to those observed in Example 1. The insertion loss was low on the order of 0.32 dB. The relation between the wavelengths of transmitted light rays and the extinction ratios was also identical to that observed in Example 1 as shown in FIG. 2. The variation of the insertion loss depending on the variation of the wavelengths of the transmitted light rays ranged from 0.2 to 0.7 dB over the wavelength range of from 1510 to 1640 nm.

EXAMPLE 4

A magnetic crystal was prepared according to the same procedures used in Example 1 except that the content of $Bi_2O_3$ in the melt was reduced. Thus, a magnetic crystal having a composition represented by the compositional formula: $Tb_{1.39}Yb_{1.40}Ca_{0.02}Bi_{0.19}Fe_{4.65}Al_{0.35}O_{12}$ was deposited on a GGG substrate in a thickness of about 1.5 mm. The resulting magnetic crystal had a lattice constant of 12.382 Å. The substrate remaining on the magnetic crystal was removed by graining and the body was mirror-polished to a thickness of 1.15 mm.

Figure 3:
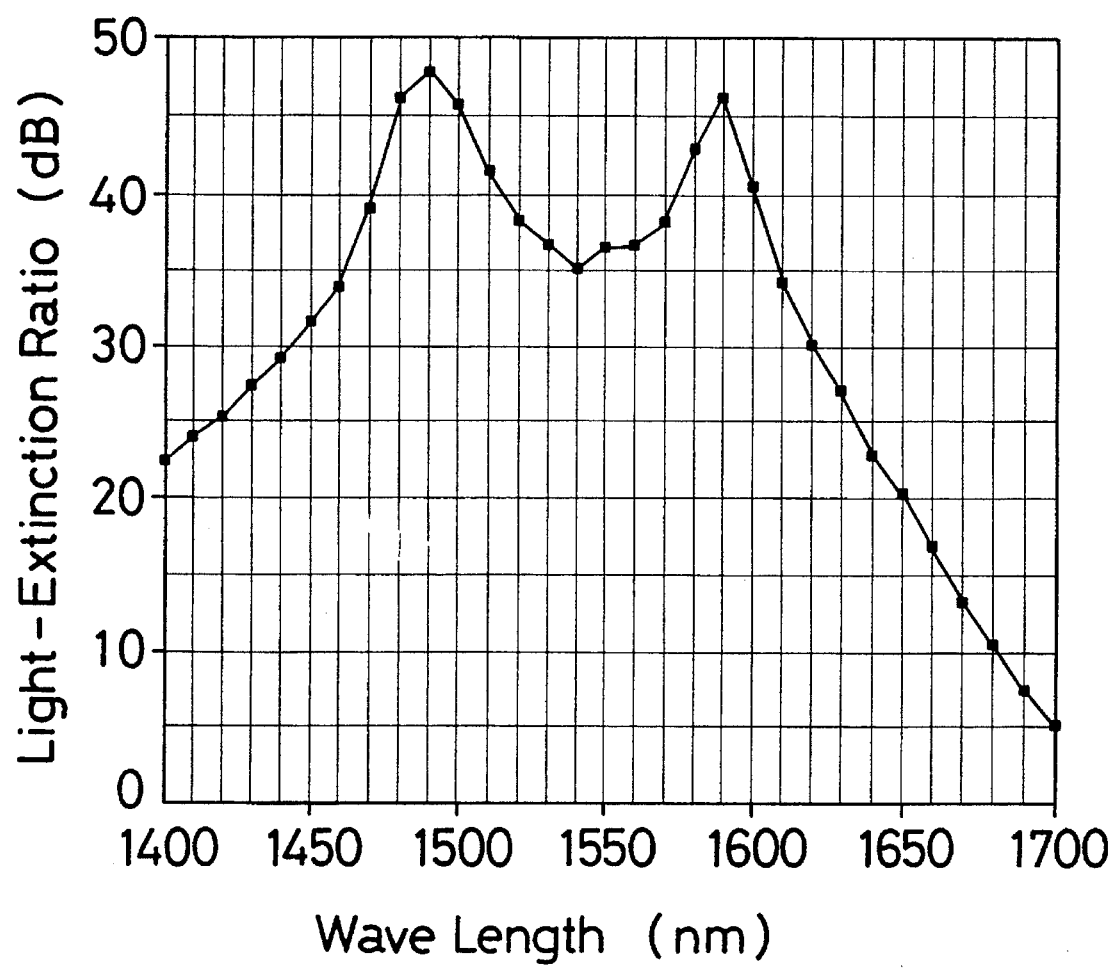
FIG. 3 is a graph showing the relation between the light-extinction ratios and the wavelengths observed on the optical isolators according to the present invention prepared in Examples 4 and 6.

The magnetic crystal chip thus prepared was subjected to a coating treatment in the same manner used in Example 1 and a plurality of the chips thus treated were put in piles to give a Faraday's rotator. The resulting rotator was placed in a magnetic field having the same magnitude used in Example 1 and examined for the rotational angle of the plane of polarization using a linearly polarized light having a wavelength of 1550 nm and the wavelength-dependency which were found to be 44.5 ° and 1470 to 1590 nm respectively. Then an optical isolator was formed by combining the rotator with a polarizer 2, an analyzer 3 and the like in the same manner used in Example 1. The light-extinction ratio and the insertion loss determined using a light having a wavelength of 1550 nm were found to be 36 dB and 0.31 dB respectively. The relation between the wavelengths of transmitted light rays and the extinction ratios was shown in FIG. 3. The isolator was fount to have an extinction ratio of not less than 35 dB over a wide wavelength range extending from 1470 to 1590 nm. Moreover, the change in the insertion loss of the isolator was found to be very small on the order of 0.2 to 0.7 dB within this wavelength range.

EXAMPLE 5

A magnetic crystal was prepared according to the same procedures used in Example 1 except that $Eu_2O_3$ was substituted for the $CaCO_3$ used in Example 1. Thus, a magnetic crystal having a composition represented by the compositional formula: $Tb_{1.20}Yb_{1.40}Eu_{0.16}Bi_{0.24}Fe_{4.7}Al_{0.3}O_{12}$ was deposited on a GGG substrate in a thickness of about 1.4 mm. The lattice constant thereof was found to be 12.382 Å. The substrate remaining on the magnetic crystal was removed by graining and the film was mirror-polished to a thickness of 1.20 mm.

The magnetic crystal chip thus prepared was subjected to a coating treatment in the same manner used in Example 1 and a Faraday's rotator was produced in the same procedures used in Example 1 except that the number of the Faraday's rotators laminated was changed to 3. The resulting rotator was placed in a magnetic field having the same magnitude used in Example 1 and examined for the rotational angle of the plane of polarization using a linearly polarized light having a wavelength of 1550 nm and the wavelength-dependency which were found to be identical to those observed in Example 1. Then an optical isolator was formed by combining the rotator with a polarizer 2, an analyzer 3 and the like in the same manner used in Example 1. The light-extinction ratios for the light reflected back having a wavelength of 1550 nm were identical to those observed in Example 1. The insertion loss thereof was found to be 0.35 dB. The relation between the wavelengths of transmitted light rays and the extinction ratios was also identical to that observed in Example 1 as shown in FIG. 2. The variation of the insertion loss depending on the variation of the wavelengths of the transmitted light rays ranged from 0.25 to 0.75 dB over the wavelength range of from 1470 to 1590 nm.

EXAMPLE 6

A magnetic crystal was prepared according to the same procedures used in Example 5 except that the content of $Bi_2O_3$ in the melt was reduced. Thus, a magnetic crystal having a composition represented by the compositional formula: $Tb_{1.20}Yb_{1.40}Eu_{0.21}Bi_{0.19}Fe_{4.65}Al_{0.35}O_{12}$ was deposited on a GGG substrate in a thickness of about 1.5 mm. The resulting magnetic crystal had a lattice constant of 12.382 Å. The GGG substrate remaining on the magnetic crystal was removed by graining and the body was mirror-polished to a thickness of 1.15 mm.

The magnetic crystal chip thus prepared was subjected to a coating treatment in the same manner used in Example 1 and a Faraday's rotator was produced in the same procedures used in Example 1 except that the number of the Faraday's rotators laminated was changed to 3. The resulting rotator was placed in a magnetic field having the same magnitude used in Example 1 and examined for the Faraday's rotational angle for a linearly polarized light having a wavelength of 1550 nm and the wavelength-dependency which were found to be identical to those observed in Example 4. Then an optical isolator was formed by combining the rotator with a polarizer 2, an analyzer 3 and the like in the same manner used in Example 1. The light-extinction ratio of the optical isolator for a light having a wavelength of 1550 nm was identical to that observed in Example 4. The insertion loss thereof was found to be 0.36 dB. The relation between the wavelengths of transmitted light rays and the extinction ratios was also identical to that observed in Example 4 shown in FIG. 3. The isolator was found to have an extinction ratio of not less than 35 dB over the same wavelength range observed in Example 4. Moreover, the change in the insertion loss of the isolator was found to be very small on the order of 0.26 to 0.76 dB within this wavelength range.

Comparative Example 1

To a crucible of platinum, there were added $Tb_4O_7$, $Bi_2O_3$, $Fe_2O_3$, $Ga_2O_3$, $B_2O_3$ and PbO as starting materials, they were melted by heating at about 1100° C., the resulting melt was maintained at a temperature of about 830° C., then a GGG substrate was dipped in the melt and rotated therein to grow an epitaxial film on the substrate. In this respect, the substrate used for growing the crystal was a GGG substrate having a diameter of 25 mm and a thickness of 1.5 mm. Thus, a magnetic crystal having a composition represented by the compositional formula: $Tb_{2.6}Bi_{0.4}Fe_{4.9}Ga_{0.1}O_{12}$ was formed on both sides of the GGG substrate according to the liquid phase epitaxial growth technique. The lattice constant of the resulting magnetic crystal was found to be 12.448 Å. In this case, if the thickness of the epitaxial film was increased to a level of not less than 2 μm, the crystal film was cracked. This clearly indicates that this method can never provide any epitaxial film having a thickness sufficient for the production of Faraday's rotators.

Comparative Example 2

The same procedures used in Example 5 were repeated except that $Ga_2O_3$ was substituted for $Al_2O_3$, that the content of $Yb_2O_3$ was reduced and that an SGG substrate was substituted for the GGG substrate used in Example 5 to give a magnetic crystal identical to that produced in Example 5. The resulting film had a composition represented by the following compositional formula: $Tb_{2.3}Yb_{0.1}Eu_{0.2}Bi_{0.4}Fe_{4.7}Ga_{0.3}O_{12}$. When the thickness of the film was increased up to about 1.0 mm, the magnetic crystal formed was cracked. The lattice constant of the body was found to be 12.454 Å.

The resulting crystal was cut and polished to give a piece having a diameter of 1 mm and a thickness of 1.32 mm. Further, the faces having a diameter of 1 mm were mirror-finished and an anti-reflection coating was applied thereto to give a Faraday's rotator. The productivity was very low, because the crystal had many cracks and accordingly, only several Faraday's rotators could be produced from the resulting crystal wafer.

Comparative Example 3

The same procedures used in Example 1 were repeated except that $CaCO_3$ was not added to the starting materials for melt to give a crystalline body identical to that produced in Example 1. Thus, a magnetic crystal having a composition represented by the following compositional formula: $Tb_{1.34}Yb_{1.42}Bi_{0.24}Fe_{4.65}Al_{0.35}O_{12}$ was deposited on a GGG substrate in a thickness of about 1.5 mm Any cracking was not observed. The lattice constant of the body was found to be 12.382 Å.

The resulting film was cut and the remaining GGG substrate was removed, by graining, from the magnetic crystal. Then the chip was polished to give a piece of 2 mm square having a thickness of 1.4 mm. Further, the faces of 2 mm square were coated with an anti-reflection coating comprising two layers of $SiO_2$ and $Al_2O_3$ respectively. After the application of the anti-reflection coating, the insertion loss thereof was determined and found to be high on the order of 18 dB. This fact indicates that the resulting rotator cannot be used as a Faraday's rotator.

Comparative Example 4

The same procedures used in Example 4 were repeated except that $CaCO_3$ was not added to the starting materials for melt to give a magnetic crystal identical to that produced in Example 4. The resulting magnetic crystal had a composition represented by the following compositional formula: $Tb_{1.39}Yb_{1.42}Bi_{0.19}Fe_{4.65}Al_{0.35}O_{12}$. The same results as those observed in Comparative Example 3 were obtained except that the insertion loss was found to be 17 dB.

What is claimed is:

1. A Faraday's rotator comprising a magnetic crystal having a composition represented by the following compositional formula:

$$(Tb_{1-(a+b+c+d)}Ln^1{}_aLn^2{}_bBi_cM^1{}_d)_3(Fe_{1-e}M^2{}_e)_5O_{12},$$

wherein $Ln^1$ is at least one element selected from the group consisting of Yb, Lu and Tm; $Ln^1$ is at least one member selected from the group consisting of rare earth elements except for Tb, Yb, Lu and Tm; $M^1$ is at least one element selected from the group consisting of Ca, Mg and Sr; $M_2$ is at least one element selected from the group consisting of Al, Ga, Ti, Si and Ge; $0.2 \leq a \leq 0.6$, $0 \leq b \leq 0.3$, $0 < c \leq 0.16$, $0 < d \leq 0.02$ and $0 < e \leq 0.1$, and a lattice constant of $12.383 \pm 0.006$ Å.

2. The Faraday's rotator according to claim 1 wherein the magnetic crystal is a body grown by a liquid phase epitaxial growth method.

3. A Faraday's rotator comprising a magnetic crystal having a composition represented by the following compositional formula: $(Tb_{1-(a+b+c+d+f)}Ln^1{}_aLn^2{}_bBi_cM^1{}_dEu_f)_3(Fe_{1-e}M^2{}_e)_5O_{12}$, wherein $Ln^1$ is at least one element selected from the group consisting of Yb, Lu and Tm; $Ln^2$ is at least one member selected from the group consisting of rare earth elements except for Tb, Yb, Lu, Tm and Eu; $M^1$ is at least one element selected from the group consisting of Ca, Mg and Sr; $M^2$ is at least one element selected from the group consisting of Al, Ga, Ti, Si and Ge; $0.2 \leq a \leq 0.6$, $0 \leq b \leq 0.3$, $0 < c \leq 0.16$, $0 \leq d \leq 0.02$, $0 < e \leq 0.1$ and $0 < f \leq 0.2$, and a lattice constant of $12.383 \pm 0.006$ Å.

4. The Faraday's rotator of claim 3 wherein the magnetic crystal is a film grown by a liquid phase epitaxial growth method.

5. An optical isolator comprising a polarizer, a Faraday's rotator and an analyzer arranged in this order, wherein the Faraday's rotator as set forth in claim 1 is used.

6. The optical isolator of claim 5 wherein the polarizer, the Faraday's rotator and the analyzer are arranged in the interior of a magnetic body.

7. An optical isolator comprising a polarizer, a Faraday's rotator and an analyzer arranged in this order, wherein the Faraday's rotator as set forth in claim 3 is used.

8. The optical isolator of claim 7 wherein the polarizer, the Faraday's rotator and the analyzer are arranged in the interior of a magnetic body.

* * * * *